US010560794B2

(12) United States Patent
Guldener et al.

(10) Patent No.: US 10,560,794 B2
(45) Date of Patent: Feb. 11, 2020

(54) HOME CINEMA SYSTEM DEVICES

(71) Applicant: THOMSON Licensing, Issy-les-Moulineaux (FR)

(72) Inventors: Rolf Guldener, Oetwil am See (CH); Anton Werner Keller, Arni (CH)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 15/911,107

(22) Filed: Mar. 3, 2018

(65) Prior Publication Data

US 2018/0262855 A1 Sep. 13, 2018

(30) Foreign Application Priority Data

Mar. 7, 2017 (EP) .................................... 17305239

(51) Int. Cl.
*H04R 5/00* (2006.01)
*H04S 3/00* (2006.01)
*G10L 19/008* (2013.01)
*H04R 5/02* (2006.01)

(52) U.S. Cl.
CPC ............ *H04S 3/008* (2013.01); *G10L 19/008* (2013.01); *H04R 5/02* (2013.01); *H04R 2499/15* (2013.01); *H04S 2400/01* (2013.01)

(58) Field of Classification Search
CPC . H04S 3/008; G10L 19/008; H04N 21/23615; H04N 21/43635
See application file for complete search history.

(56) References Cited

U.S. PATENT DOCUMENTS

| 6,034,737 | A | 3/2000 | Koyama et al. |
| 7,003,119 | B1 | 2/2006 | Arthur |
| 7,212,253 | B1 | 5/2007 | De Groot et al. |
| 8,054,980 | B2 | 11/2011 | Wu et al. |
| 2002/0006206 | A1 | 1/2002 | Scofield |
| 2007/0077020 | A1* | 4/2007 | Takahama ............... H04S 3/008 386/339 |

(Continued)

FOREIGN PATENT DOCUMENTS

| CN | 200959634 | 10/2007 |
| KR | 20050069344 | 7/2005 |

(Continued)

*Primary Examiner* — Simon King
(74) *Attorney, Agent, or Firm* — Brian J. Dorini; Patricia A. Verlangieri

(57) ABSTRACT

A television and a home cinema device work together in various embodiments to render an audio signal including at least a left channel, a right channel and a center channel. The left and right channels are rendered by left and right speakers coupled to the home cinema device, while the center channel is rendered by the left and right speakers of the television. The television can receive the audio signal, decode and render the center channel and send the audio, possibly reencoded left and right channels, to the home cinema device. The television can also send the audio to the home cinema device the returns the, possibly reencoded, center channel for rendering on the television. Alternatively, the home cinema device can receive the audio signal and provide the possibly reencoded center channel to the television. In an alternative, the center channel can be rendered by a soundbar coupled to the television.

10 Claims, 6 Drawing Sheets

(56) References Cited

U.S. PATENT DOCUMENTS

| | | | |
|---|---|---|---|
| 2010/0182402 A1* | 7/2010 | Nakajima | G09G 5/006 348/42 |
| 2011/0051940 A1* | 3/2011 | Ishikawa | H04L 12/40013 381/22 |
| 2011/0116638 A1* | 5/2011 | Son | H04S 3/008 381/1 |
| 2012/0180093 A1* | 7/2012 | Ishihara | H04N 5/607 725/80 |
| 2014/0153633 A1* | 6/2014 | Ichimura | G09G 5/006 375/240.01 |
| 2015/0016642 A1* | 1/2015 | Walsh | H04S 7/301 381/307 |
| 2015/0189439 A1* | 7/2015 | Starobin | H04R 3/12 381/303 |
| 2016/0142849 A1 | 5/2016 | Satheesh et al. | |
| 2016/0307581 A1* | 10/2016 | Salmela | G10L 21/034 |
| 2017/0099558 A1* | 4/2017 | Spitznagle | G06F 3/0481 |

FOREIGN PATENT DOCUMENTS

| | | |
|---|---|---|
| WO | WO2010025200 | 3/2010 |
| WO | WO2011039413 | 4/2011 |
| WO | WO2014164361 | 10/2014 |

\* cited by examiner

HOME CINEMA SYSTEM DEVICES

RELATED TO EUROPEAN APPLICATION

This application claims priority from European No. 17305239.0, entitled "Home Cinema System Devices" filed on Mar. 7, 2017, the contents of which are hereby incorporated by reference in its entirety.

TECHNICAL FIELD

The present disclosure relates generally to home cinema and in particular to sound rendering in home cinema systems.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In order to provide a better listening experience to television viewers, one solution has been to add external speakers to the television, often driven by so-called home cinema or home theatre devices. These external speakers take over the role of the internal left and right speakers of the television. Systems with more than two speakers are known and often named by the number of speakers and bass speakers, for example 3.1 for three speakers and one bass speaker, and 5.1 for five speakers and one bass speaker. Other names for multi-channel systems are Ambisonic or surroundsound. Usually, these systems include a center speaker for speech intelligibility.

Conventional home cinema (also called home theatre) systems include a screen for displaying video, device including an amplifier for obtaining a sound signal to be sent to a number of speakers for rendering audio. The screen can be a flat surface onto which a device projects the video, but it can also be the screen of a conventional television.

Home cinema systems as described above are conventionally housed in two or more devices that are connected via HDMI (High-Definition Multimedia Interface) cables, but sometimes additional audio cables, data links or Ethernet connections are used.

HDMI is an audio/video interface described in a standard that includes several sections, such as:

DDC: Display Data Channel is a communication channel based on the I²C bus specification. HDMI requires compliant devices to implement the Enhanced Display Data Channel (E-DDC), which is used by a HDMI source device to read the Enhanced Extended Display Identification Data (E-EDID) data from a HDMI sink device to learn what audio/video formats it supports.

CEC: Consumer Electronics Control is a HDMI feature designed to allow the user to command and control up to 15 CEC-enabled devices connected through HDMI. It facilitates the transmission of remote control signals. Further, CEC allows for individual CEC-enabled devices to command and control each other without user intervention. CEC is bidirectional.

TMDS: Transition-Minimized Differential Signaling on HDMI interleaves video, audio and auxiliary data using three different packet types, called the Video Data Period, the Data Island Period and the Control Period. During the Video Data Period, the pixels of an active video line are transmitted. During the Data Island period (which occurs during the horizontal and vertical blanking intervals), audio and auxiliary data are transmitted within a series of packets. The Control Period occurs between Video and Data Island periods. TMDS is unidirectional.

ARC: Audio Reverse Channel is a unidirectional audio link intended to replace other cables between the TV and the A/V receiver or home cinema. This direction is used when the TV is the source of the video and audio stream instead of the other equipment. Without ARC, the audio output from the TV needs to be routed by another cable, typically TOS-Link or coax, into the speaker system. It uses an additional cable.

HEC: HDMI-Ethernet Channel provides a bidirectional Ethernet communication. It is combined with ARC to HEAC (HDMI Ethernet Audio Connection).

Home cinema systems are often identified by the number of speakers they include. For example, as illustrated in FIG. 1, a 3.1 system 100 typically includes one speaker 110 to the left of the screen 140, one speaker 112 to the right of the screen, a center speaker 120 positioned below, in front of or above the screen and a bass speaker 130 (whose position is less strict). The center speaker 120 and the bass speaker 130 can be located in the same physical unit. A 5.1 system includes two more speakers, and a 7.1 system a further two.

A problem with conventional home cinema systems is that it can be difficult to position the center speaker when the video is rendered on a television. There may for example be no space on the ground just in front of the television and the speaker may in some cases block the screen.

Chinese utility model CN 200959634 proposes a home cinema system that has the internal left and right speakers of the television working together as the center speaker. However, the solution requires hard wiring the home cinema system and these speakers. Further, the solution does not appear to provide any solution to possible problems when it comes to delay, inadequate mixing and volume.

It will be appreciated that it is desired to have a solution that overcomes at least part of the conventional problems related to the center speaker in home cinema systems.

SUMMARY OF DISCLOSURE

In a first aspect, the present principles are directed to a television configured for connection to a sound rendering device, the television including a decoder configured to decode a first audio signal including at least a left channel, a right channel and a center channel, and provide a decoded center channel for rendering on first speakers, and an encoder for encoding a decoded left channel and a decoded right channel to obtain a second audio signal for output to the sound rendering device for rendering sound on second speakers.

In a second aspect, the present principles are directed to a television configured for connection to a sound rendering device, the television including a decoder configured to decode an audio signal including at least a left channel, a right channel and a center channel, and provide a decoded center channel for rendering on first speakers, and an output interface configured to output the audio signal to the sound rendering device for rendering sound on second speakers.

In a third aspect, the present principles are directed to a television connection to a sound rendering device, the television including a unit configured to receive a first audio signal including at least a left channel, a right channel and a center channel, an output interface configured to output the first audio signal to the sound rendering device for rendering sound on second speakers, and a decoder configured to receive a second audio signal from said the sound rendering device, the second audio signal including the center channel or a further left channel and a further right channel obtained from the center channel, and to decode the second audio signal to provide at least one audio channel to render on at least one first speaker.

Various embodiments of the third aspect include:

That the second audio signal includes the center channel and that the television further includes a digital sound processor unit configured to process the center channel for rendering on a left speaker and a right speaker among the first speakers.

That the second audio signal includes the further left channel and the further right channel, and that the decoder is configured to provide a decoded further left channel to a left speaker and a decoded right channel to a right speaker among the first speakers.

Various embodiments of the first three aspects include:

That the television further includes a digital sound processor unit for sound processing of audio channels to be provided to the first speakers.

That the first speakers include internal left and right speakers of the television.

That the first speakers include left and right speakers of a soundbar external to the television.

That the first audio signal or the second audio signal further includes a bass channel to be rendered on a bass speaker among the first speakers.

In a fourth aspect, the present principles are directed to a sound rendering device configured for connection to a television, the sound rendering device including a decoder configured to receive a first audio signal including at least a left channel, a right channel and a center channel, decode the first audio signal to obtain the channels, and provide the left channel and the right channel to a left speaker and a right speaker coupled to the sound rendering device, and an encoder configured to encode the center channel into a second audio signal for output to the television.

In a fifth aspect, the present principles are directed to a sound rendering device configured for connection to a television, the sound rendering device including a decoder configured to receive a first audio signal including at least a left channel, a right channel and a center channel, decode the first audio signal to obtain the channels, and provide the left channel and the right channel to a left speaker and a right speaker coupled to the sound rendering device, a digital sound processor unit configured to process the center channel to obtain a second left channel and a second right channel, and an encoder configured to encode the second left channel and the second right channel into a second audio signal for output to the television.

Various embodiments of the fourth and fifth aspects include:

That the decoder is configured to receive the audio signal from the television.

That the decoder is further configured to receive a video signal and wherein the encoder is further configured to provide the video signal to the television. The the decoder can be configured to receive the video signal and the audio signal from a source other than the television.

BRIEF DESCRIPTION OF DRAWINGS

Preferred features of the present principles will now be described, by way of non-limiting example, with reference to the accompanying drawings, in which.

DESCRIPTION OF EMBODIMENTS

The description will illustrate the present principles in a 3.1 home cinema system, but it will be understood that the present principles also apply to other configurations such as 5.1 and 7.1.

According to the present principles, the television is coupled to a home cinema device. Speakers connected to the home cinema device are configured to function as right speaker and left speaker, while the left and right speakers of the television are configured to render audio as the center speaker of the home cinema system. The bass can be rendered by a bass speaker connected to the home cinema device or by a bass speaker of the television or both.

It is noted that the home cinema device may include one or more of the speakers; thus, when the description mentions a plurality of speakers coupled to the home cinema system (or similar expressions), it should be understood that at least one of these speakers can be embodied in the home cinema device.

Figure 1:
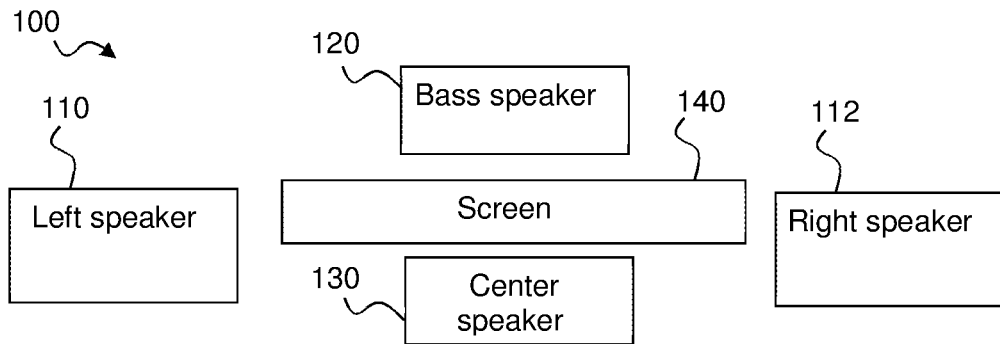
FIG. 1 illustrates a conventional 3.1 home cinema system.
Figure 2:
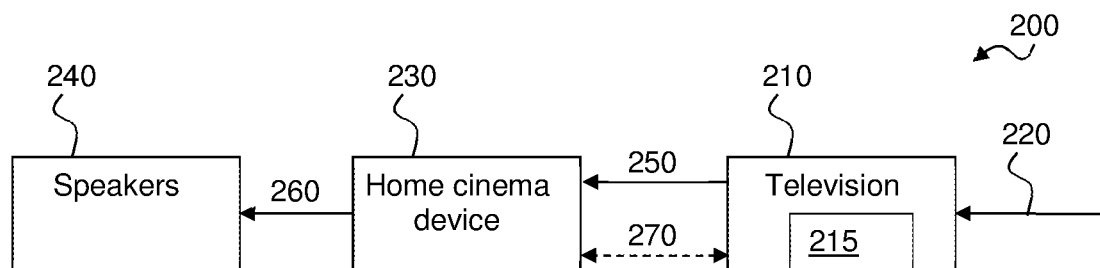
FIG. 2 illustrates a first example of a home cinema system according to the present principles.

FIG. 2 illustrates a first example of a home cinema system 200 according to the present principles. A television 210 comprising internal speakers 215 is coupled to a source 220 of audiovisual content such as an antenna, a Blu-ray disc player, a decoder or a set-top box, and to a home cinema device 230, which in turn is coupled to a plurality of speakers 240, of which there are two in the example 3.1 configuration (not counting a possible bass speaker).

The source 220 provides audio or audiovisual content, i.e. audio and video, to the television 210 that renders sound on its internal speakers 215, provides an ARC audio signal 250 to the home cinema device 230, which then sends a plurality of audio signals 260 to the plurality of speakers 240, normally one audio signal per speaker. The television 210 and the home cinema device 230 also exchange control information 270, such as for example Consumer Electronics Control (CEC) and DDC information. CEC and ARC are defined in HDMI version 1.4 and later. Various embodiments of the first example will be described hereinafter.

Figure 3:
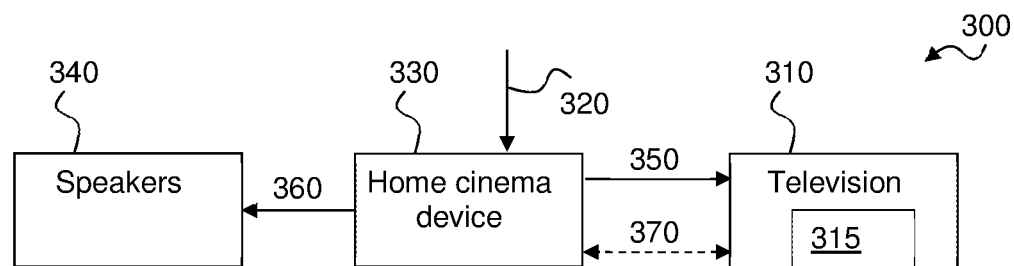
FIG. 3 illustrates a second example of a home cinema system according to the present principles.

FIG. 3 illustrates a second example of a home cinema system 300 according to the present principles. A television 310 comprising internal speakers 315 is coupled to a home cinema device 330, which in turn is coupled to a plurality of speakers 340, of which there are two in the example 3.1 configuration (not counting a possible bass speaker). In the second example, the home cinema device 330 is coupled to a source 320 of audio or audiovisual content such as a Blu-ray disc player, settop-box or an Internet connection.

The source 320 provides audiovisual content, i.e. audio and video, to the home cinema device 330 that provides a plurality of audio signals 360 to the plurality of speakers 340, normally one audio signal per speaker and an audiovisual signal 350 to the television 310 for rendering on the internal speakers 315 of the television 310. The television 310 and the home cinema device 330 also exchange control information 370, such as for example Consumer Electronics Control (CEC) and DDC information.

Figure 4:
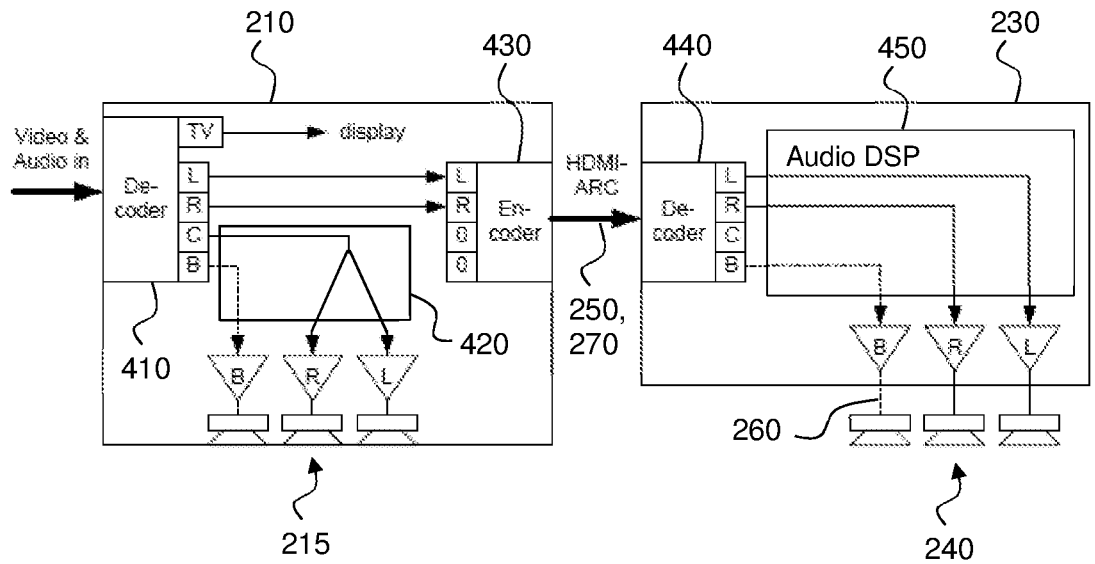
FIG. 4 illustrates a first embodiment of the first example, illustrated in FIG. 2, according to the present principles.

FIG. 4 illustrates a first embodiment of signal flow in the example illustrated in FIG. 2 according to the present principles. The television 210 receives en encoded audiovisual content from a source (not illustrated) and decodes the encoded audiovisual content in at least one decoder 410; typically, audio and video are decoded in separate decoders. The decoded video is output to the display (not shown) of the television 210 in a conventional manner. However, the decoder is also configured to decode the received 3.1 audio and to send the decoded center audio channel to a audio Digital Signal Processor (DSP) 420 configured to process the center audio channel into an internal left channel and an internal right channel that, respectively, are sent to the internal left and right speakers 215; this way, the internal left and right speakers 215 emulate the center speaker. In addition, the decoder can be configured to send the decoded bass channel to the internal bass speaker 215 via the audio DSP 420. The decoder is further configured to send the decoded left and right channels (and possibly the decoded bass channel) to an encoder 430 that in turn is configured to encode these channels into an audio signal 250, such as an HDMI-ARC signal, and output the audio signal 250.

The output audio signal 250 is intended for a home cinema device 230 that is configured to process the received audio signal 250 in the conventional manner, which is to say that it includes a decoder 440 for decoding the audio signal 250 to obtain decoded audio signals that are provided to an audio DSP 450 whose output are a plurality of audio signals 260 intended for the plurality of speakers 240 to which the home cinema device 230 is connected. In the example, the plurality of speakers 240 includes a left speaker, a right speaker and possibly a bass speaker. As the center channel has no signal and the corresponding output can thus be muted automatically.

In this as in other embodiments, the audio DSPs 420, 450 are configured to mix and split input audio signals. These DSPs can for example equalize the audio for all channels separately or by selectively mixing components from different audio channels according to user settings. The DSPs can further increase or reduce the delay applied to the audio channels in order to achieve, for instance, lip-sync. The delay can be set to zero (meaning no delay) or to a fixed delay that can be set manually or by a processor, possibly via HDMI commands.

As can be seen, the sound for the bass speaker can thus, depending on the implementation, be rendered by the bass speaker 215 of the television 210 or the bass speaker connected to the home cinema device 230; it should be noted that it also is possible to render the sound for the bass speaker on both bass speakers.

Due to the reencoding at the encoder of the audio signal with only the left and right channels active (bass and center channels being set to zero), the home cinema device 230 does not need to receive any CEC information for handling the rendering of the right and left audio channels with the external speakers. At the same time, the television automatically renders the center channel (and possibly the bass channel) on its internal speakers.

Figure 5:
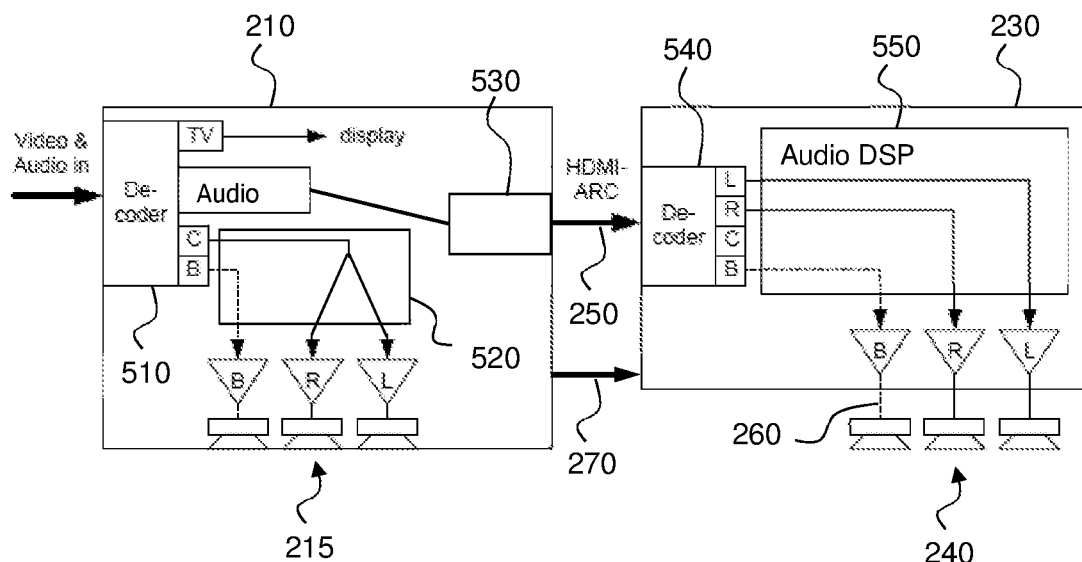
FIG. 5 illustrates a variant of the first embodiment of the first example, illustrated in FIG. 2, according to the present principles.

In an alternative illustrated in FIG. 5, the decoder 510 is configured to send the received encoded 3.1 audio signal via an output interface 530 to the decoder 540 of the home cinema device 230, thus obviating the need for the encoder 430. In the television 210, an audio DSP 520 functions as audio DSP 420 in FIG. 4, while an audio DSP 550 in the home cinema device functions as audio DSP 450 in FIG. 4. The variant further comprises a CEC connection 270 in addition to the HDMI ARC connection 250.

In the embodiments in FIGS. 4 and 5, it is preferred that the decoder 210 informs the home cinema device 230 that it renders the center channel (and possibly base channel) itself; this information can be sent using for example Consumer Electronic Control (CEC) or Display Data Channel (DDC), both of which are implemented in the HDMI standard, versions 1.4 and later. Owing to the information received, the home cinema device 230 can mute the channels rendered by the television 210.

Figure 6:
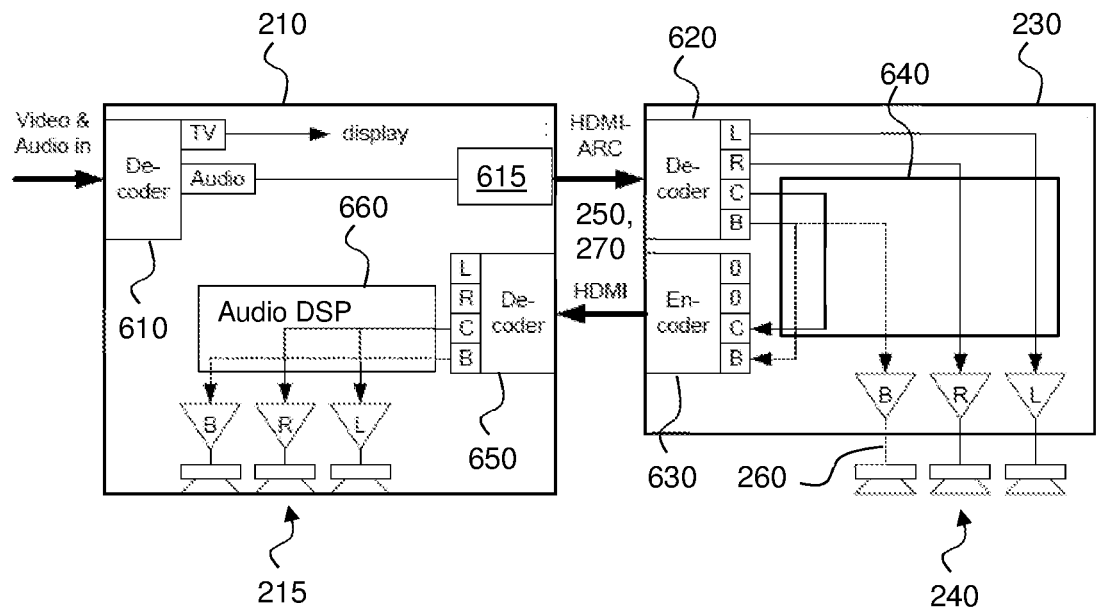
FIG. 6 illustrates a second embodiment of the first example, illustrated in FIG. 2, according to the present principles.

FIG. 6 illustrates a second embodiment of signal flow in the example illustrated in FIG. 2 according to the present principles. As in FIG. 4, the television 210 receives en encoded audiovisual content from a source (not illustrated), decodes at least the encoded video content in the at least one decoder 610, and outputs the decoded video to the display (not shown) of the television 210.

However, the decoder 610 is configured to output through an output interface 615 the encoded 3.1 audio content, for example as a HDMI-ARC signal, to the home cinema device 230. The decoder 610 is also configured to send information, for example using CEC or DDC, to inform the home cinema device 230 that the television 210 is to render the center channel (and, if this is the case, the bass channel).

The home cinema device 230 includes a decoder 620 configured to generate a plurality of audio channels as explained with reference to FIG. 4. The decoder 620, using the received information about the channels to be rendered by the television, is configured to provide the center channel (and possibly the bass channel) to an encoder 630, possibly through an audio DSP 640. Using the audio DSP 640 can enable flexibility for altering (e.g. fading) audio channels in a different way than that provided by the source.

The encoder 630 is configured to encode the center (and possibly bass) channel into an audio signal, for example an HDMI audio signal, and output the audio signal intended for the television 210.

The television 210 includes a second decoder 650 configured to decode the audio signal received from the home cinema device 230: the audio signal is processed to obtain the center channel and, possibly, a bass channel. The second decoder 650 is configured to output decoded audio channels to an audio DSP 660 configured to provide the processed channels to the respective speakers 215, i.e., center channel to the internal left speaker and the internal right speaker and, possibly, the bass channel to the internal bass speaker. As already mentioned with reference to FIG. 4, the bass channel can be rendered on the bass speaker 215 of the television, the bass speaker connected to the home cinema device or both.

In an alternative, the audio DSP 640 is configured to encode the center (and possible bass) channel into reconstructed left and right channels (and possibly a bass channel). The encoder is configured to encode these channels into a 2.0 or 2.1 audio signal that is output, intended for the television 210. The second decoder 650 is configured to decode the received audio signal into a reconstructed left channel provided to the internal left speaker, a reconstructed right channel provided to the internal right speaker and, possibly, a bass channel provided to the internal bass speaker. Using the audio DSP 640, it is possible to drive the internal left and right speakers 215 of the television 210 individually, which means that it is not necessary for the television 210 to switch the output of the center channel to internal left and right speakers.

Figure 7:
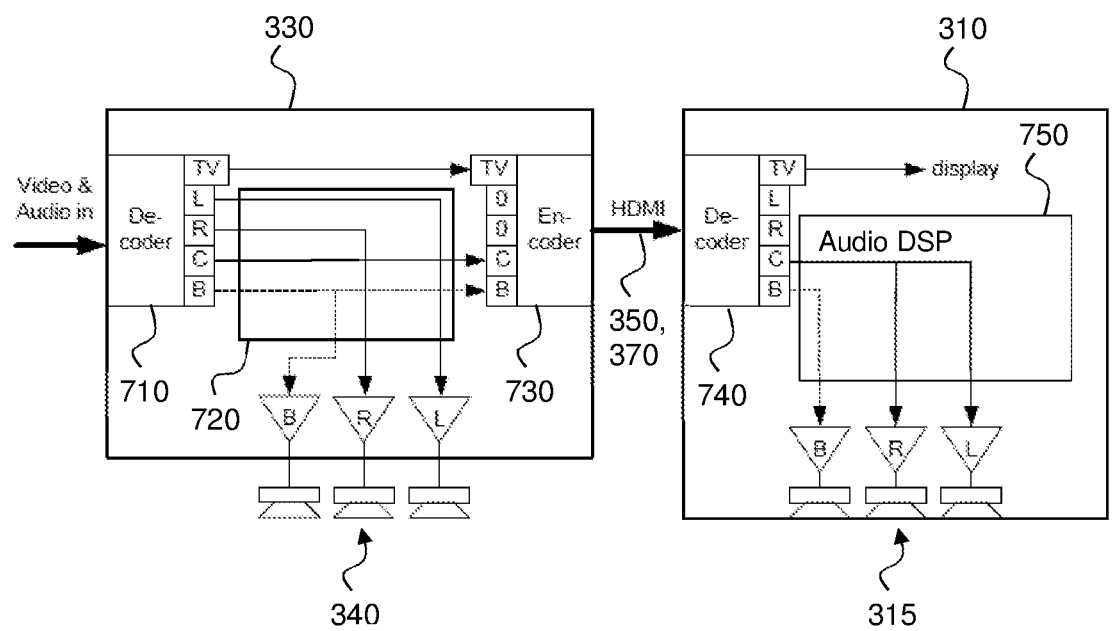
FIG. 7 illustrates a first embodiment of the second example, illustrated in FIG. 3, according to the present principles.

FIG. 7 illustrates a first embodiment of signal flow in the example illustrated in FIG. 3 according to the present principles. The home cinema device 330 is configured to receive an encoded audiovisual signal from a source (not shown). A decoder 710 in the home cinema device 330 is configured to decode at least the left channel, the right channel and possibly the bass channel of the audio signal and provide the decoded channels to the respective speakers among the plurality of speakers 340. The decoder 710 can also be configured to either decode the center (and possibly bass) channel and provide it (or them) to an audio DSP 720 configured to process the channel(s) and provide the processed channel(s) to an encoder 730 and, in case the bass channel is to be rendered by a bass speaker among the plurality of speakers 340, to this bass speaker. The encoder 730 is configured to encode the remixed channel(s)—i.e. the center channel and possibly the bass channel—and output these channels as a 2.0 or 2.1 signal together with the received encoded video signal in a signal 350, 370, possibly as a HDMI signal, to the television 310.

The television 310 comprises a decoder 740 configured to decode the received signal. The video signal is decoded and rendered as described hereinbefore. The decoder 740 is configured to decode the audio signal into a center channel and, possibly, a bass channel. The bass channel can be provided to an internal bass speaker 315. Using information in the received signal 370, the decoder 740 is further configured to mute the output normally used to provide the left channel and the right channel and instead output the center channel to an audio DSP 750 that is configured to output the processed center channel to both the internal left speaker and the internal right speaker 315. The audio DSP 750 can also process the bass channel and output processed audio to the bass speaker 315 as well.

Figure 8:
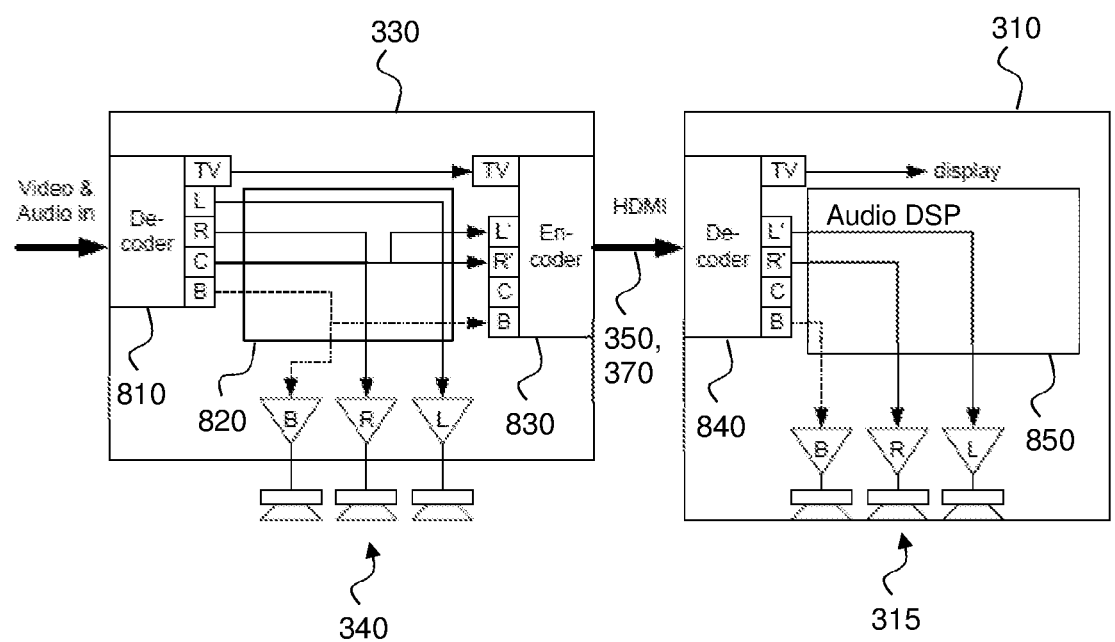
FIG. 8 illustrates a variant of the first embodiment of the second example, illustrated in FIG. 3, according to the present principles.

In an alternative illustrated in FIG. 8, the audio DSP 820 is configured to receive the center channel and the bass channel from the decoder 810, and process the center channel (and possibly the bass channel) to provide, instead of the center channel as described with reference to FIG. 7, a reconstructed left channel L' and a reconstructed right channel R' (and possibly a bass channel B) to the encoder 830. In this case, the decoder 840 of the television 310 is configured to use information in the received signal 370 to work in the conventional manner, i.e., output the (reconstructed) left channel and the (reconstructed) right channel to an audio DSP 850 configured to process these channels and provide processed channels to the internal left speaker and to the internal right speaker 315.

It is noted that the audio DSP 820 can be included in the decoder 810.

It is noted that the present principles also work for an audio only source providing the user with sound processed and outputted in the same manner.

It is noted that the present principle also works while using the HEC (HDMI Ethernet Channel).

It is also noted that a decoder can include a hardware interface configured to receive at least an audio signal and that an encoder can include a hardware interface configured to output an encoded audio signal.

It has already been mentioned that the television and the home cinema device can exchange information about sound rendering capabilities using Consumer Electronic Control (CEC) or Display Data Channel (DDC). This will now be further described.

The television can store a DDC table in its firmware to be accessed and provided to the home cinema device when the two devices connect (for example after power up or hotplug, also called hot plugging). The fields and the information in the DDC table is defined in the HDMI standard, but the standard allows proprietary information and future development is also possible.

For the purposes of the present principles, the DDC table can store the following information:

| | | |
|---|---|---|
| Center speaker emulation | Yes/no | Exemplary parameters: wattage, gain, audio delay, frequency-response |
| Bass speaker emulation | Yes/no | Exemplary parameters: wattage, gain, audio delay, frequency-response |

In addition, the present principles use two new CEC commands, which is allowed by the HDMI standard, version 1.4, appendix for CEC, but could easily be implemented in a future HDMI standard:

<Speaker Mode Request> ["Center"] allows the home cinema device to activate the center speaker emulation in the television.

<Set TV Speaker as Center> ["On"] allows the television to respond that center speaker emulation is activated.

Figure 9:
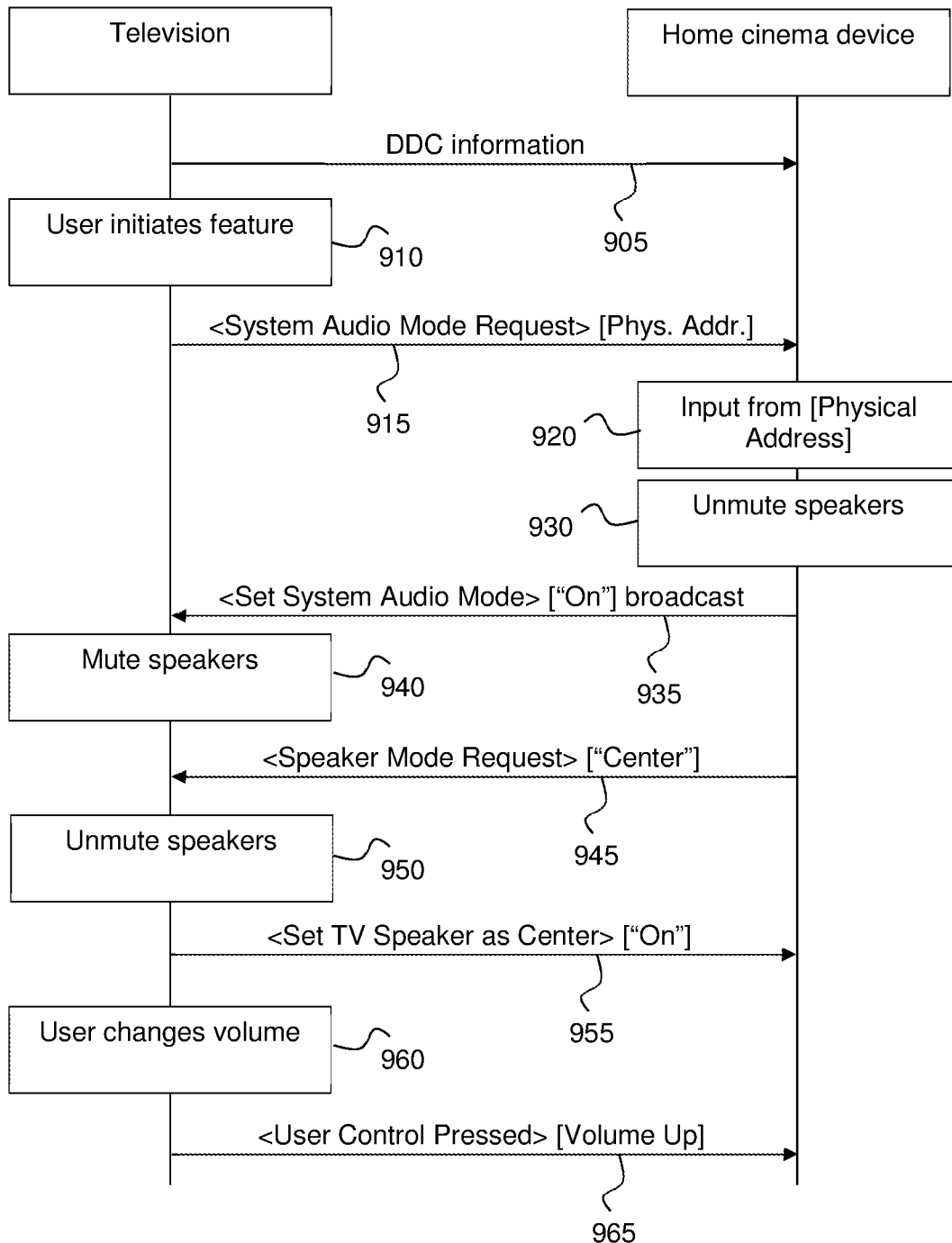
FIG. 9 illustrates a method for using DDC and CEC for the home cinema device to activate center speaker emulation in the television according to the present principles.

FIG. 9 illustrates a method for using DDC and CEC for the home cinema device to activate center speaker emulation in the television according to the present principles.

In step 905, the home cinema device receives DDC information from the television.

In step 910, a user initiates center speaker emulation on the television that sends, in step 915, a <System Audio Mode Request> [Physical Address] message to the home cinema device. In case the user has activated center speaker emulation previously, step 910 is not performed and step 915 is performed automatically. In response, the home cinema device switches, in step 920, its input to the physical address and unmutes its speakers in step 930. Steps 910-930 are described on page 279 of the HDMI 1.4 standard, CEC FIG. 26.

In step 935, the home cinema device sends a <Speaker Mode Request> ["Center"] to the television to activate center speaker emulation in the television. The television, in step 950, unmutes its speakers and, in step 955, returns a <Set TV Speaker as Center> ["On"] to indicate to the home cinema device that center speaker emulation has been activated.

The user can then for example control the output by, for instance, increasing the volume in step 960, which causes the television to send, in step 965, a <User Control Pressed>

[Volume Up] message to the home cinema system and so on, as illustrated on page 282 of the HDMI 1.4 standard, CEC FIG. 31.

Figure 10:
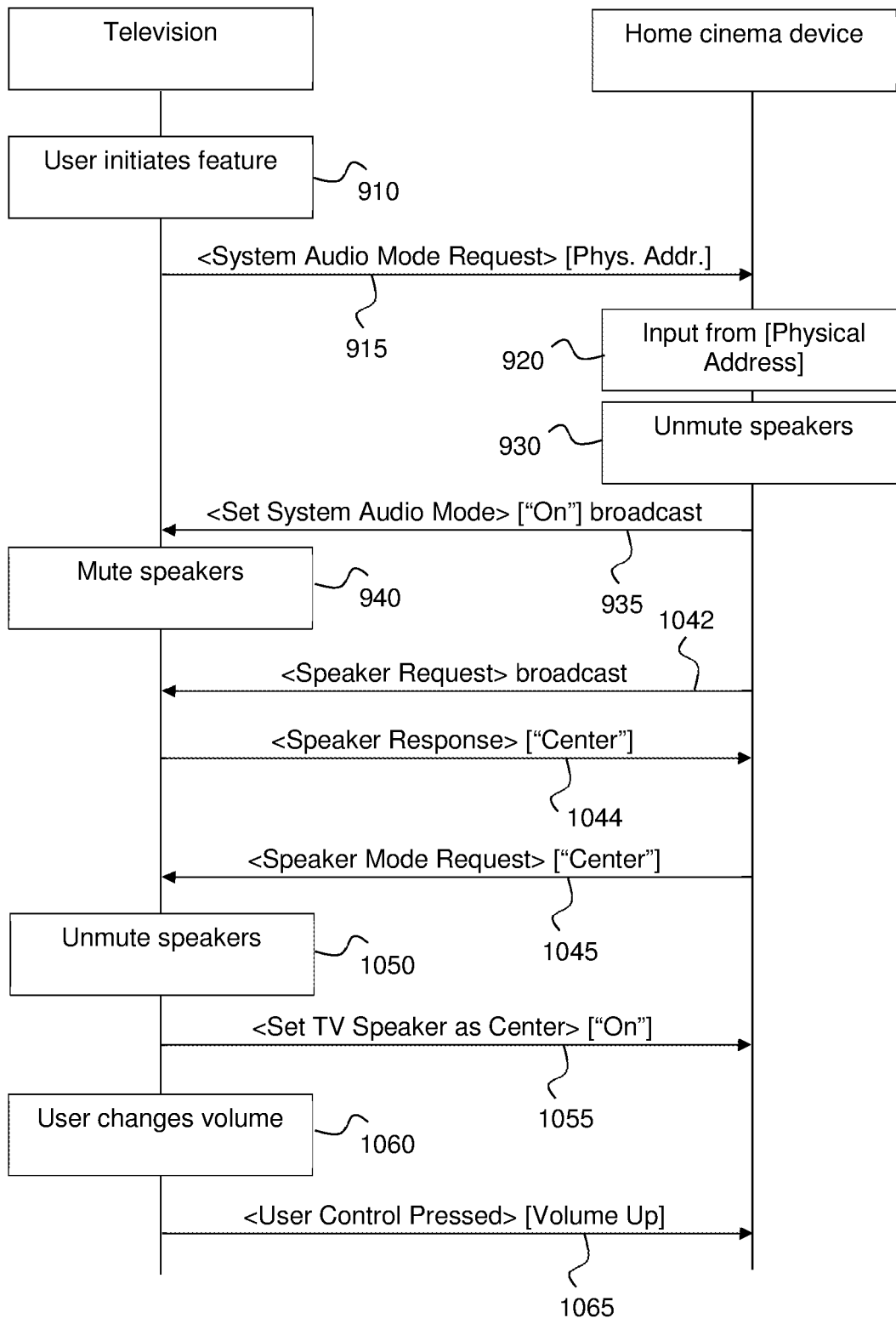
FIG. 10 illustrates a method for using CEC for the home cinema device to activate center speaker emulation in the television according to the present principles.

FIG. 10 illustrates a method for using CEC for the home cinema device to activate center speaker emulation in the television according to the present principles. This enables activation of center speaker emulation in the television when the DDC does not include sufficient information.

The method starts with steps 910-940 already described with reference to FIG. 9.

Then the home cinema system sends, in step 1042, a <Speaker Request> broadcast message to the television to query the television about at least its emulation capabilities. In case the television is capable of emulating the center speaker, it returns, in step 1044, a <Speaker Response> ["Center"] to inform the home cinema system of this capability. The home cinema system can then send, in step 1045, a <Speaker Mode Request> ["Center"] to the television to activate center speaker emulation in the television. The television, in step 1050, unmutes its speakers and, in step 1055, returns a <Set TV Speaker as Center> ["On"] to indicate to the home cinema device that center speaker emulation has been activated. Steps 1045-1055 are similar to steps 945-955 in FIG. 9.

As in FIG. 9, the user can then for example control the output by, for instance, increasing the volume in step 1060, which causes the television to send, in step 1065, a <User Control Pressed> [Volume Up] message to the home cinema system and so on, as illustrated on page 282 of the HDMI 1.4 standard, CEC FIG. 31.

It will be appreciated that the center speaker can also be emulated by a device other than the television, such as for example a soundbar. In this case, the device that sends the center channel for rendering—the television in some embodiments, the home cinema device in others—is configured to provide the center channel to this other device. Alternatively, the television can output the center channel to the other device even when the television receives the center channel from the home cinema device.

Throughout the description, wired HDMI has been used as a non-limiting example, but it will be appreciated that other suitable technologies may also be used. For example, the present principles are particularly suited for a wireless version of HDMI, but would also work with an optical HDMI version.

The skilled person will appreciate that the illustrated devices are very simplified for reasons of succinctness and that real devices in addition would include features such as internal connections and power supplies.

As can be seen, the present principles can allow center speaker emulation by the television in a home cinema system.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, calculation, enabling/disabling or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The invention claimed is:

1. A television configured for connection to a sound rendering device, the television comprising:
   a decoder configured to:
      decode a first audio signal comprising at least a left channel, a right channel and a center channel; and provide a decoded center channel for rendering on first speakers; and an encoder for encoding a decoded left channel and a decoded right channel to obtain a second audio signal for output to the sound rendering device for rendering sound on second speakers.

2. The television of claim 1, further comprising a digital sound processor unit for sound processing of audio channels to be provided to the first speakers.

3. The television of claim 1, wherein the first speakers comprise internal left and right speakers of the television.

4. The television of claim 1, wherein the first speakers comprise left and right speakers of a soundbar external to the television.

5. The television of claim 1, wherein the first audio signal or the second audio signal further comprises a bass channel to be rendered on a bass speaker among the first speakers.

6. A television configured for connection to a sound rendering device, the television comprising:
a decoder configured to:
decode an audio signal comprising at least a left channel, a right channel and a center channel; and
provide a decoded center channel for rendering on first speakers; and
an output interface configured to output the audio signal to the sound rendering device for rendering sound on second speakers.

7. A sound rendering device configured for connection to a television, the sound rendering device comprising:
a decoder configured to:
receive a first audio signal comprising at least a left channel, a right channel and a center channel;
decode the first audio signal to obtain the channels; and
provide the left channel and the right channel to a left speaker and a right speaker coupled to the sound rendering device; and
an encoder configured to encode the center channel into a second audio signal for output to the television.

8. The sound rendering device of claim 7, wherein the decoder is configured to receive the first audio signal from the television.

9. The sound rendering device of claim 7, wherein the decoder is further configured to receive a video signal and wherein the encoder is further configured to provide the video signal to the television.

10. The sound rendering device of claim 9, wherein the decoder is configured to receive the video signal and the first audio signal from a source other than the television.

* * * * *